United States Patent [19]

Fox

[11] 4,005,802
[45] Feb. 1, 1977

[54] APPARATUS FOR TRANSFERRING AND METERING FLUIDS

[75] Inventor: Robert Eugene Fox, Minburn, Iowa

[73] Assignee: Deere & Company, Moline, Ill.

[22] Filed: Nov. 7, 1975

[21] Appl. No.: 629,972

[52] U.S. Cl. .................................................. 222/14
[51] Int. Cl.² ............................................ B67D 5/30
[58] Field of Search ................ 222/14, 15, 16, 17, 222/18, 19, 20

[56] References Cited

UNITED STATES PATENTS

| 2,711,696 | 6/1955 | Rowell | 222/14 X |
| 3,087,650 | 4/1963 | Reed et al. | 222/14 |
| 3,638,832 | 2/1972 | Sauber et al. | 222/16 |
| 3,651,989 | 3/1972 | Westrich | 222/14 |

FOREIGN PATENTS OR APPLICATIONS 1,163,347  9/1969  United Kingdom ................ 222/14

*Primary Examiner*—Stanley H. Tollberg
*Assistant Examiner*—Hadd S. Lane

[57] ABSTRACT

A portable transferring and metering apparatus is provided which permits quick and easy transfer of chemical fluids from one container to another without unnecessary exposure of the operator to chemicals being transferred. An adjustable metering device controls the transfer of a desired volume of chemicals and shuts down the transfer pump upon completed transfer of that volume of chemicals.

7 Claims, 5 Drawing Figures

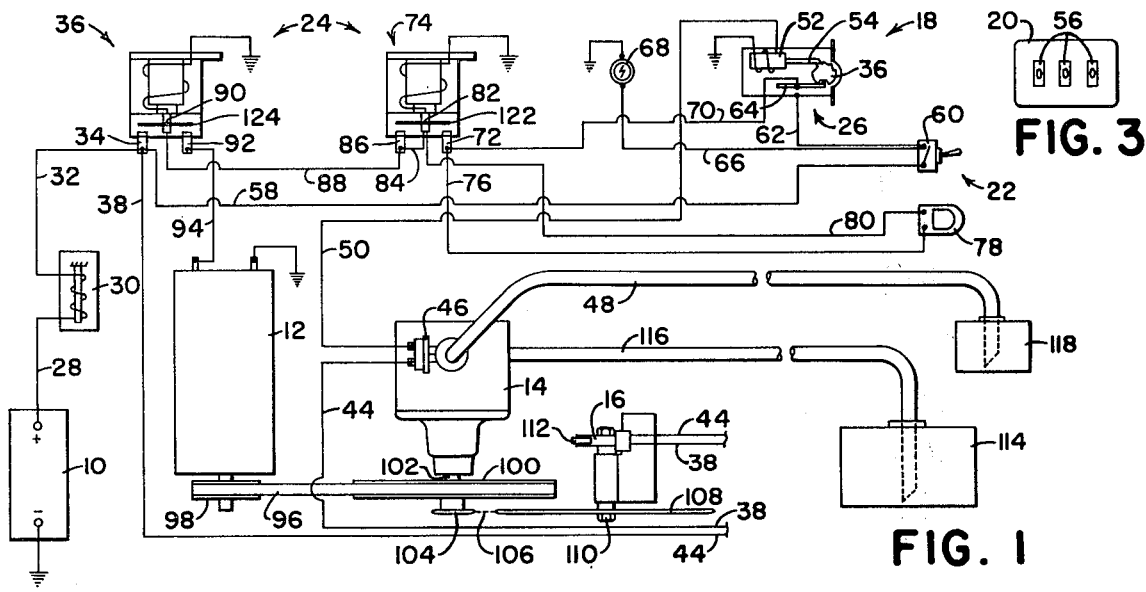
FIG. 3
FIG. 1
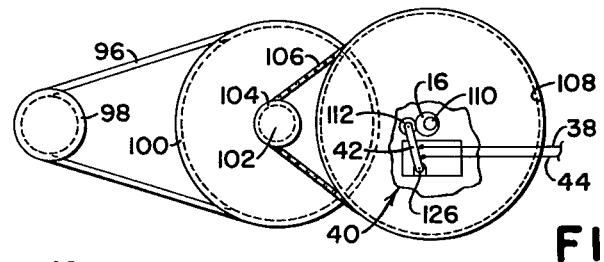
FIG. 2
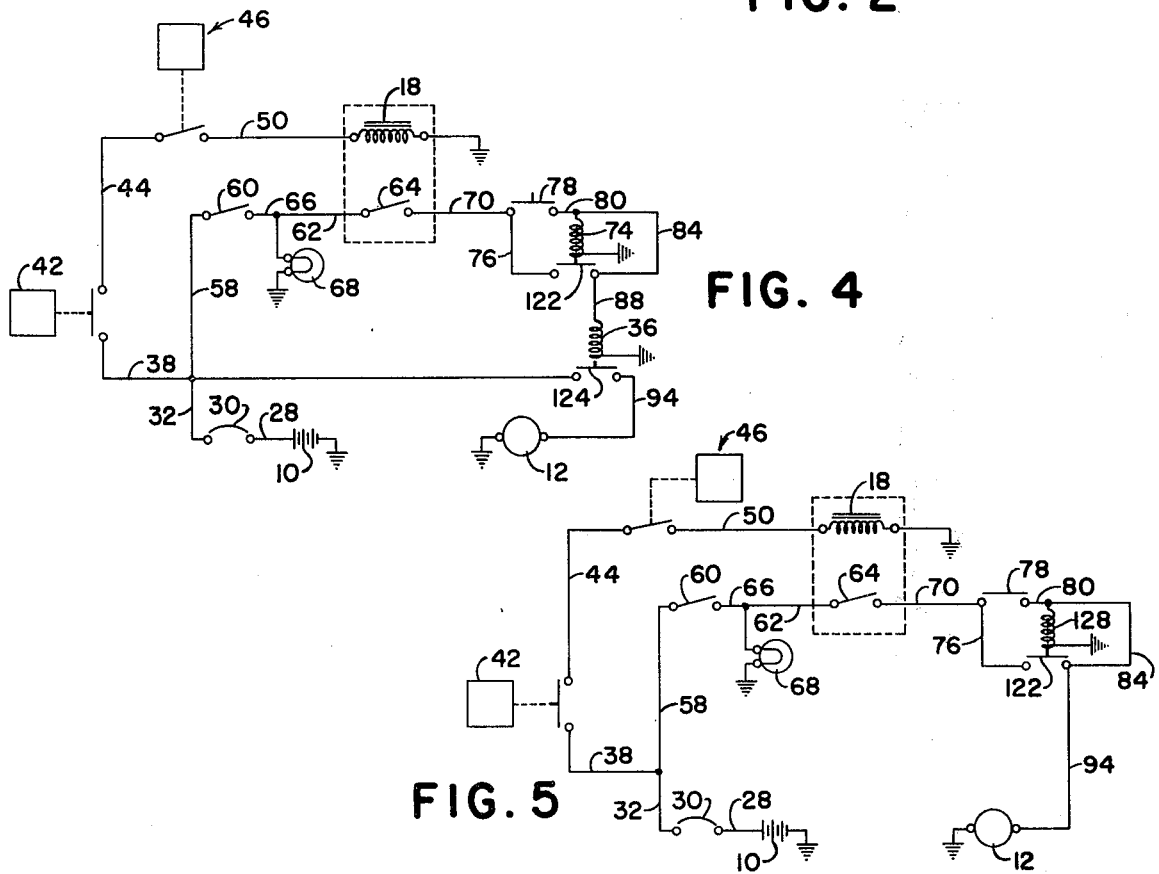
FIG. 4
FIG. 5

APPARATUS FOR TRANSFERRING AND METERING FLUIDS

BACKGROUND OF THE INVENTION

The present invention relates generally to agricultural implements, and more particularly relates to apparatus for transferring and metering chemicals from one container to another container.

Modern farming practices indicate that herbicides, insecticides, fertilizers and other chemical solutions will be used with increasing frequency to realize optimum crop yields. These chemicals are for the most part applied by the farmer.

To realize the most economical purchase of agricultural chemicals, the farmer will buy in bulk amounts. To apply the chemicals to the crops or soil requires that the desired amount of concentrate or solution be transferred from the bulk storage container to the application apparatus. Because many of the agricultural chemicals can present health hazards when contacted or inhaled over a period of time, the transferring process can be hazardous. Magnifying the problem is the fact that the farmer must store, transfer and apply several different chemicals throughout the growing season.

Existing transfer apparatus include manual and powered transfer pumps. The manual type of pump is usually portable and includes an inlet hose or pipe which is inserted into the bulk storage container. The pump handle is then manually turned and the flow directed through an outlet hose or pipe into the receiving container. With this type of pump, the farmer is exposed to the chemical fumes and solution during the entire transfer process and cannot be confident that the volume desired has been transferred. The powered type of pump generally presents less of an exposure problem for the farmer since he need only insert the inlet and outlet hoses in the proper containers and start the motor or power source. However, these pumps do not provide metering indicators which would allow the farmer to transfer only the required amount of expensive chemical to the receiving container. Powered pumps also require a powering source of energy and therefore are bulky or inconvenient, presenting time consuming problems when several chemicals are to be transferred, mixed or taken from different storage locations.

SUMMARY OF THE INVENTION

To overcome these problems, applicant has provided in the present invention a portable transfer and metering apparatus having means for automatically transferring a desired volume of chemicals or fluid from one container to another.

The principal object of the invention is to provide a pump having a metering control means which permits the operator to dial in the desired chemical volume to be transferred and which will then shut down the pump upon the completed transfer of that volume.

Another object of the present invention is to provide a transferring pump which can easily be coupled to the chemical supply and receiving containers without requiring unnecessary physical exposure of the operator to the chemicals transferred.

It is further an object of the present invention to provide a compact and portable transfer and metering apparatus which includes its own portable power source.

A more specific object of the present invention includes the provision of a metering control means which will not indicate transfer of chemical volume when the pump is not transferring fluid.

BRIEF DESCRIPTION OF THE DRAWINGS

FIG. 1 is a schematic and diagrammatic view illustrating the transfer and metering apparatus.

FIG. 2 is a side view of the mechanical drive mechanism for the counter cam.

FIG. 3 is an enlarged end view of the counter indicator.

FIG. 4 is a diagram illustrating the electrical circuit for the transfer and metering apparatus shown in FIG. 1.

FIG. 5 is a diagram illustrating a modified electrical circuit for the transfer and metering apparatus.

DESCRIPTION OF THE PREFERRED EMBODIMENT

Referring now to the drawings, there is illustrated in FIG. 1 a portable transferring and metering apparatus including a portable electric power source or twelve volt battery 10, a motor 12, a motor driven fixed displacement pump 14, a counter cam 16 driven by the pump 14, counter means 18 including a pre-settable volume indicator 20, a source control means 22, relay means 24 and a reset means 26 for shutting down the pump 14 when the preset volume has been transferred.

The preferred embodiment includes the portable power source 10 connected by a line 28 to a suitable circuit breaker 30. From the circuit breaker 30 a line 32 leads to the first terminal 34 of a first relay 36. Line 38 leads from the first terminal 34 of the first relay 36 to a switch means 40 which includes a lever switch 42 activated by the counter cam 16 in fixed relationship to the volume displaced by the pump 14. The exact manner in which the counter cam 16 is powered by the pump 14 will be explained hereinbelow. From the lever switch 42 a line 44 leads to a pressure sensitive means or low pressure switch 46 which is inserted into an outlet line 48 of the pump 14. Leading from the low pressure switch 46 is line 50 which connects with a solenoid coil 52 having a slidable core 54 therein. With each closing of the lever switch 42, a circuit will be completed from the counter means 18 to the solenoid coil 52. As the circuit is completed, the slidable core 54 will shift moving the indicator dial gears 56 to reflect a one-tenth gallon change in pumped volume.

Also leading from the first terminal 34 of the first relay 36 is line 58 which connects to the first terminal 34 a power switch 60. The power switch 60 is in turn connected by line 62 to a reset switch 64 which is mechanically coupled with the indicator dials 56 to be in an open position when the indicator dials 56 read zero. Also connected to the power switch 60 by a line 66 is an electric light 68, activated whenever the power switch 60 is moved to an "on" position.

From the reset switch 64, a line 70 leads to a first terminal 72 of a second relay 74. Leading from the first terminal 72 of this second relay 74 is a line 76 which is connected to a start means or starter button 78. Line 80 leads from the starter button 78 and is connected to the coil terminal 82 of the second relay 74. From this coil terminal 82, a line 84 is connected with a second terminal 86 of the second relay 74. Line 88 connects the second terminal 86 of the second relay 74 to the coil terminal 90 of the first relay 36. To the second terminal 92 of the first relay 36, line 94 leads to the motor 12.

As best viewed in FIG. 2, the motor 12 is mechanically coupled to the pump 14 by belt 96 trained over motor pulley 98 and the pump pulley 100. A pump shaft 102 drivingly rotates a pump sprocket 104 having chain 106 trained over it and around cam sprocket 108 secured to cam shaft 110 to drivingly rotate the cam 16 in fixed relation to the pump 14 displacement. In the present embodiment, the cam 16 will rotate one revolution to close the circuit between lines 38 and 44 when the pump 14 has transferred one-tenth gallon of chemicals or fluid. The cam 16 is secured to the cam shaft 110 for rotation about an eccentric path and contacts roller 112 which is rotatably attached to the lever switch 42.

The transferring and metering apparatus is compact and portable and in operation can be easily moved to the chemical supply 114 which is to be transferred. To operate, the farmer will first couple the inlet line 116 with the desired chemical or fluid supply 114 and then couple the outlet line 48 with the fluid deposit tank or pipe 118. The desired volume to be transferred will be manually dialed into the indicator 20 and is reflected in the present embodiment in tenths of a gallon. As a value is dialed onto the indicator 20, the reset switch 64 will move into contact with the line 62 leading in from the power switch 60. The power switch 60 is then flipped to the "on" position and the start button 78 then pushed. A separate start button 78 is provided to activate the pump 14 and assures that an accidental start up does not occur when the power switch 60 is moved to an "on" position.

After the starter button 78 is pushed, the coil terminal 82 of the second relay 74 is activated by the power source 10 and causes the coil's slidable core plate 122 to move into a latched position and connect the first 72 and second 86 terminals of the second relay 74. Feedback from the first terminal 72 of the second relay 74 then flows through the core plate 122, the terminal 86 and the line 84 to the coil terminal 82 of the second relay 74 to latch the coil in the activated position. Connection of the first terminal 72 of the second relay 74 with the second terminal 86 of the second relay 74 causes the current to flow through the line 88 to the coil terminal 90 of the first relay 36 and latch the slidable core plate 124 of the first relay 36 to connect the terminals 34 and 92 of the first relay 36. Power is then provided from the power source 10 through the first terminal 34 of the first relay 36 to the second terminal 92 of the first relay 36 and through line 94 to activate the motor 12.

As the pump shaft 102 is drivingly powered by the motor 12, the cam shaft 110 will rotate, the attached cam 16 will rotate against the roller 112 and the lever switch 42 will be moved in an arc about its pivotal connection 126 to complete the circuit from the power source 10 to the pressure sensitive switch 46 with each cam rotation. As long as the pump 14 is displacing fluid at a pressure above a minimum value through the outlet 48, the pressure switch 46 will be closed and the connection between the lever switch 42 and the counter means 18 will be completed. With each rotation of the cam 16, a fixed amount of fluid or chemical is transferred and the lever switch 42 is closed one time completing the circuit to the counter means 18 one time. As that circuit is completed, the slidable core 54 in the solenoid coil 52 will shift to index the indicator dial 56 and reduce the value indicated thereon by a tenth of a gallon. Should the fluid supply 114 become empty or the pump not create an outlet pipe 48 pressure above a minimum value, the conventional pressure sensitive switch 46 will not remain closed to complete the circuit from the counter cam 16 to the counter means 18 and the closing of the lever switch 42 will not cause the indicator dial 56 to be indexed. In this way, the indicator 20 will not be reduced whenever fluid is not pumped through the outlet 48.

When the readings on the preset indicator 20 have been reduced to zero, the reset switch 64 will open to thereby disconnect the power switch 60 and the first terminal 72 of the second relay 74. With this break in the circuit, no power will flow from the first terminal 72 of the second relay 74 through plate 122 to the second terminal 86 of the second relay 74 and through line 84 to the slidable coil terminal 82 of the second relay 74 to maintain the coil terminal 82 in a closed position. Accordingly, the coil plate 122 will become unlatched resulting in a cessation of current flow from the second terminal 86 of the second relay 74 to the coil terminal 90 of the first relay 36. Thereupon the slidable core plate 124 of the coil in the first relay 36 will unlatch disconnecting the circuit between the first terminal 34 of the first relay 36 and the second terminal 92 of the first relay 36 thereby stopping the current flow from the source line 32 to the motor 12.

The preferred embodiment utilizes a first 36 and second 74 relay in providing current from the power source 10 to the source control means 22 and motor 12. However, an alternate embodiment as shown in FIG. 3 utilizes only a single relay 128. While the current flowing to and through the reset switch 64 will be increased in this embodiment, shown in FIG. 5, a suitable switch could be substituted for the lower capacity reset switch 64 necessary in the first embodiment. However, to minimize the amperage load encountered in the reset switch 64 and to provide a control circuit having a lower cost and longer life, the second relay 74 is added in the preferred embodiment so that the full motor amperage flows only through it and to the motor.

I claim:

1. Apparatus for conveying and metering a desired volume of fluid from a fluid supply to a fluid deposit comprising: an electrical source; a motor; a fluid displacing pump driven by the motor and having an inlet in communication with the fluid supply and an outlet in communication with the fluid deposit, means responsive to pump action, including switch means effective to close in a predetermined relationship to pump fluid displacement; counter means, including for indicating a desired fluid displacement, said counter means being responsive to closing of the switch means for indicating the cumulative volume displaced by the pump; relay means including a first and second relay, said second relay responsive to activation of the first relay to connect the electrical source with the motor, source control means including a manually activated power switch and start means, said power switch movable between a first activated and second deactivated position, and when in the first position effective to connect the electrical source and start means, and said start means responsive to manual activation and effective when activated and when the power switch is in the activated position to connect the source with said first relay; and reset means responsive to indicated volume displaced and effective to disconnect the first relay and electrical source when said volume displaced is equivalent to the indicated desired volume displacement whereby said second relay is deactivated to thereby disconnect the electrical source and motor.

2. The invention defined in claim 1 wherein the switch means includes a cam driven by the motor in a fixed relationship to fluid displacement, said cam operatively coupled with a switch to close the latter in fixed relationship to fluid displacement.

3. The invention defined in claim 1 wherein the counter means further includes adjustable indicator means for indicating a desired fluid displacement value operatively coupled with the reset means.

4. Apparatus for conveying and metering a desired volume of fluid from a fluid supply to a fluid deposit comprising: an electrical source; a motor; a fluid displacing pump driven by the motor and having an inlet in communication with the fluid supply and an outlet in communication with the fluid deposit; counter means, including a cam driven by the motor in a fixed relationship to pump fluid displacement and including switch means closable in response to cam movement; adjustable indicator means for indicating a desired fluid displacement value; counter means responsive to closing of the switch means to reduce the indicator means value in accordance with the volume of fluid displaced through the pump; pressure sensitive means responsive when fluid pressure in the pump outlet is below a specific value to cause the counter means to be unresponsive to closing of the switch means; relay means including a first and second relay, said second relay responsive to activation of the first relay to connect the electrical source to the motor; source control means including a manually activated power switch and a start means, said power switch movable between an "on" and an "off" position, and when in the "on" position effective to connect the electrical source and start means, and said start means responsive to manual activation and effective when activated and when said power switch is in an "on" position to connect the electrical source to said first relay; and reset means responsive to the indicator means and effective when said indicator reflects a specific value to disconnect the electrical source and first relay whereby said second relay is de-activated thereby disconnecting the electrical source and said motor.

5. Apparatus for conveying and metering a desired volume of fluid from a fluid supply to a fluid deposit comprising: an electrical source; a motor; a fluid displacing pump driven by the motor and having an inlet in communication with the fluid supply and an outlet in communication with the fluid deposit, means responsive to pump action, including switch means effective to close in a predetermined relationship to pump fluid displacement; counter means, including means for indicating a desired fluid displacement, said counter means being responsive to closing of the switch means for indicating the cumulative volume displaced by the pump; pressure sensitive means responsive when fluid pressure in the pump outlet is below a specific value to cause the counter means to be unresponsive to closing of the switch means; manually activated source control means; relay means responsive to actuation of the source control means to connect the electrical source with the motor; and reset means responsive to indicated volume displaced and effective to disconnect the motor and electrical source when said volume displaced is equivalent to the indicated desired volume displacement.

6. Apparatus for conveying and metering a desired volume of fluid from a fluid supply to a fluid deposit comprising: an electrical source; a motor; a fluid displacing pump driven by the motor and having an inlet in communication with the fluid supply and an outlet in communication with the fluid deposit, means responsive to pump action, including switch means effective to close in a predetermined relationship to pump fluid displacement; counter means, including means for indicating a desired fluid displacement, said counter means being responsive to closing of the switch means for indicating the cumulative volume displaced by the pump; pressure sensitive means responsive when fluid pressure in the pump outlet is above a specific value to cause the counter means to be responsive to closing of the switch means; manually activated source control means; relay means responsive to actuation of the source control means to connect the electrical source with the motor; and reset means responsive to indicated volume displaced and effective to disconnect the motor and electrical source when said volume displaced is equivalent to the indicated desired volume displacement.

7. Apparatus for conveying and metering a desired volume of fluid from a fluid supply to a fluid deposit comprising: an electrical source; a motor; a fluid displacing pump driven by the motor and having an inlet in communication with the fluid supply and an outlet in communication with the fluid deposit, means responsive to pump action, including switch means effective to close in a predetermined relationship to pump fluid displacement; counter means, including means for indicating a desired fluid displacement, said counter means being responsive to closing of the switch means for indicating the cumulative volume displaced by the pump; pressure sensitive means responsive when fluid pressure in the pump outlet is below a specific value to cause the counter means to be unresponsive to closing of the switch means; relay means including a first and second relay, said second relay responsive to activation of the first relay to connect the electrical source with the motor, source control means including a manually activated power switch and start means, said power switch movable between a first activated and second deactivated position, and when in the first position effective to connect the electrical source and start means, and said start means responsive to manual activation and effective when activated and when the power switch is in the activated position to connect the source with said first relay; and reset means responsive to indicated volume displaced and effective to disconnect the first relay and electrical source when said volume displaced is equivalent to the indicated desired volume displacement whereby said second relay is deactivated to thereby disconnect the electrical source and motor.

* * * * *

UNITED STATES PATENT OFFICE
CERTIFICATE OF CORRECTION

Patent No. 4,005,802          Dated    1 February 1977

Inventor(s)  Robert Eugene Fox

It is certified that error appears in the above-identified patent and that said Letters Patent are hereby corrected as shown below:

Column 4, line 52, after "including" insert --means--.

Signed and Sealed this

*Fifteenth* Day of *November 1977*

[SEAL]

Attest:

RUTH C. MASON  LUTRELLE F. PARKER
*Attesting Officer*  *Acting Commissioner of Patents and Trademarks*